Aug. 5, 1958 E. P. MOORE ET AL 2,846,526
POTENTIAL MONITORING CIRCUIT
Filed June 20, 1955
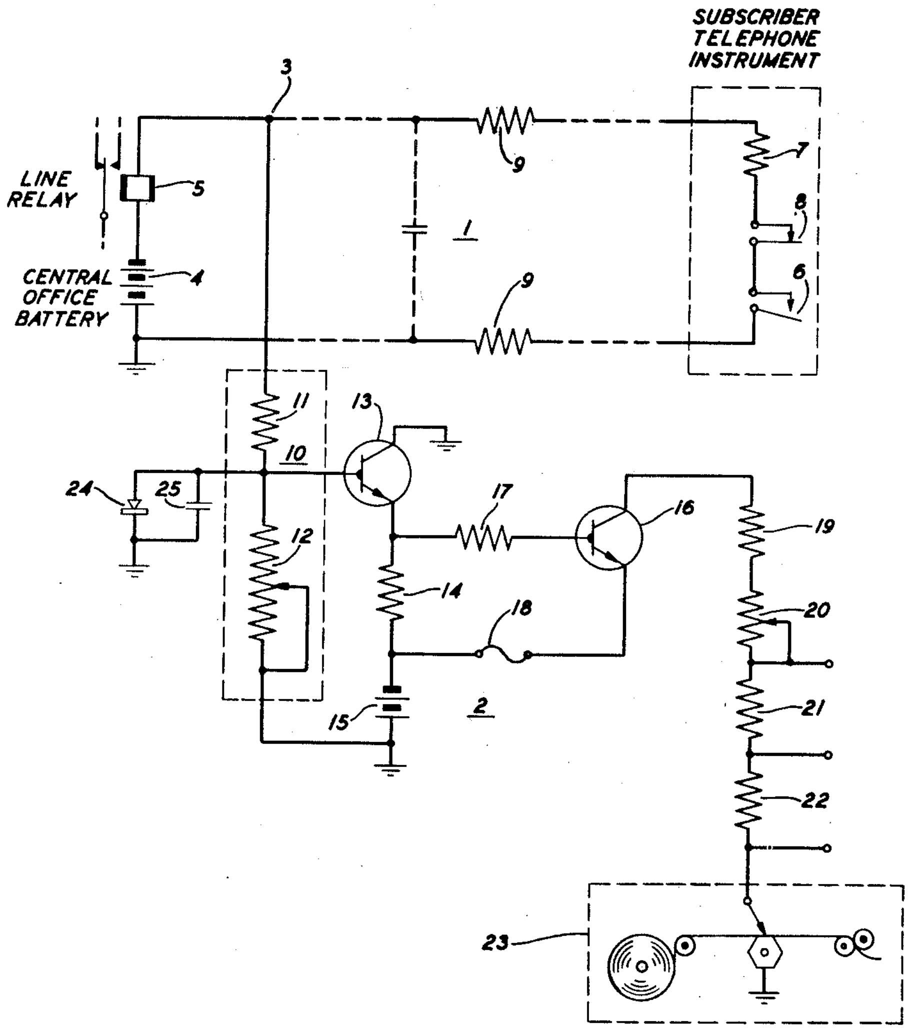
INVENTORS E. P. MOORE
R. L. TRENT
BY W. L. Keefauver
ATTORNEY United States Patent Office 2,846,526

Patented Aug. 5, 1958

2,846,526

POTENTIAL MONITORING CIRCUIT

Ernest P. Moore, Newark, and Robert L. Trent, Pluckemin, N. J., assignors to Bell Telephone Laboratories, Incorporated, New York, N. Y., a corporation of New York Application June 20, 1955, Serial No. 516,642

5 Claims. (Cl. 179—175.2)

This invention relates to potential monitoring circuits and more particularly to circuits for observing and recording potential variations on a telephone subscriber's line.

One basic requirement of all monitoring circuits is that disturbance of the line which is being observed must be held to a minimum. This is necessary so that the conditions observed will represent normal operation. In many situations it is also desirable to monitor simultaneously, and record on one chart, the voltage changes on a large number of circuits. For example, in telephone central office installations occasions frequently arise for studying the potential variations about a predetermined level at certain locations. A record of these variations could indicate such information as the subscribers' dialing habits thus permitting greater certainty in the design requirements for central office equipment to obtain maximum utilization thereof during peak load periods. One recorder for simultaneously monitoring 100 telephone circuits, and the record it produces, are described and illustrated in an article entitled "The 100-pen recorder" by C. H. Erving, Jr., in the Bell Laboratories Record, October 1954, page 389.

It is evident that the utility of a multicircuit monitoring instrument is controlled to a certain extent by its size and weight since it must be moved about in, and among, the installations where circuits to be monitored are located. It is therefore one object of this invention to facilitate the simultaneous monitoring of potential variations on a large number of circuits.

It is another object of this invention to reduce the distortion introduced in the circuit which is being monitored by the connection of a monitoring circuit.

An additional object of this invention is to reduce the size, weight and operating power of equipment used to monitor simultaneously a large number of circuits.

In accordance with one embodiment of the invention each pen of an electric multipen recording device is energized by the constant current from a separate monitoring circuit including a transistor switch of the type disclosed in P. A. Reiling, Serial No. 419,924, filed February 17, 1954. The switch is connected to a telephone subscriber's line by a high impedance potentiometer and an emitter follower having its input terminals connected across a portion of the potentiometer. With this arrangement a single instrument, including the multipen recorder, charts the voltage variations on as many as 80 circuits by making a line when the switch is closed and a space when it is open.

One feature of this invention is that each stylus of the recording device is supplied with constant recording current for any single transistor switch load impedance.

Another feature of the invention is that the switch load impedance for each transistor switch can be varied through discrete steps. The resultant difference in the intensity of the recording may be used to indicate the type of line service which is being monitored.

Still another feature of the invention is the employment of a transistor switch which is readily changed from its open to its closed circuit condition by electronic means and which permits such low leakage currents to flow in the recorder during the open circuit intervals that extraneous traces are avoided.

Additional objects and advantages of this invention will be apparent from an examination of the following specification, and the single drawing wherein one of the potential monitoring circuits of a multipen line observing and recording instrument for a telephone subscriber's line is described and illustrated.

Referring to the drawing, a telephone subscriber loop 1 has a potential monitoring circuit 2, in accordance with the invention, connected to a loop 1 at monitoring junctions comprising the junction 3 and ground. The source of potential 4, which is a central office battery, and the line relay 5 which is connected in series therewith are located in the telephone central office. The switches 6 and 8 represent the normally open switchhook and the normally closed dial contacts, respectively, of a subscriber's telephone. When the subscriber lifts the telephone handset from its cradle normally open contacts 6 are closed. Operation of the dial causes normally closed dial contacts 8 to be cyclically opened and closed. The resistor 7 represents the impedance of the subscriber's telephone instrument. Resistors 9 represent subscriber line resistance. Monitor circuit 2 senses potential variations in terms of potential increases above a predetermined level at point 3 with respect to ground. Potential decreases could be sensed by using transistors of opposite conductivity type in a circuit similar to monitor circuit 2.

A high resistance potentiometer 10, including the resistors 11 and 12, is connected between monitor point 3 and ground. Potentiometer 10 is thus connected in parallel with the series circuit including line relay 5 and the central office battery 4, and it presents such a high impedance to loop 1 that only a negligible amount of power is shunted away from loop 1, even under the most adverse operating conditions. The transistor 13 is connected as an emitter follower with its collector connected to ground. Signals are applied between the base and emitter electrodes, and the output potentials appear at the emitter electrode. The emitter electrode is connected to ground through a series circuit including the load resistor 14 and the bias source 15. In some instances it may be desirable to add a diode in series with the emitter electrode to increase the effective reverse impedance of the emitter junction. The base electrode of transistor 13 is connected to an intermediate point on potentiometer 10 so that the base is biased slightly negative with respect to the emitter by central office battery 4.

The transistor 16 operates as an electronic switch with its collector and emitter electrodes being the switch output terminals. Its base-emitter circuit is connected across resistor 14 of the emitter follower circuit by means of the direct current coupling resistor 17. Resistor 17 also prevents transistor 16 from short-circuiting resistor 14 after transistor 16 is triggered into conduction. If resistor 14 were short-circuited, the emitter follower action of transistor 13 would be lost, and resistor 12 effectively short-circuited, thus reducing the impedance of potentiometer 10 and causing a substantial disturbance in loop 1. Fuse 18 performs the dual function of (1) protecting transistor 13 from drawing excessive current in the event a terminal of potentiometer 10 is accidentally brought in contact with excessively high positive potentials and (2) preventing transistor 16 from drawing excessive collector current in the event that its load circuit should be inadvertently short-circuited.

Resistors 19, 20, 21 and 22 are connected in the load circuit of transistor switch 16 to limit the current through the electric recording device schematically represented at 23. The recorder illustrated employs current-sensitive paper for charting the monitored conditions. One such recording device is described in the above-mentioned article by C. H. Erving, Jr. When switch 16 is closed recorder 23 is energized from source 15 via a series circuit including resistors 19–22, transistor 16, and fuse 18. Taps are provided at discrete points in the load circuit of transistor 16 so that different levels of saturation current can be provided in recorder 23 to cause corresponding degrees of intensity in the record. The intensity of the record may be used to indicate the particular type of subscriber service which is being monitored.

A diode 24 connected between the base terminal of transistor 13 and ground protects the transistor from excessive voltage surges occurring as a result of the resonance of the inductance of line relay 5 with the inherent loop capacitance of the subscriber's line upon the opening of switch contacts 6 and 8. Diode 24 is of the type which conducts either when forward biased by a positive potential or when reverse biased beyond a predetermined negative value. Between these two bias limits it is nonconducting. The quiescent bias on the base of transistor 13 is set at a value which maintains transistor 13 cut off. The reverse characteristic of diode 24 is chosen so that this quiescent bias is less negative than that value at which the diode 24 will become conducting in the reverse direction.

Thus, in the circuit shown in the drawing, diode 24 is normally nonconducting when switchhook contacts 6 are open. Upon the closing of switchhook contacts 6 and the cyclic opening and closing of dial contacts 8 the resonance of the inherent capacitance of loop 1 with the inductance of relay 5 causes oscillations in the voltage at the monitoring point 3. During the cyclic period following the closing of the dial contacts 8, these oscillations are damped by the line and subscriber's set resistances represented by resistors 7 and 9 in loop 1. However, when either contact 6 or 8 is opened, and maintained open, there is no effective damping of the oscillations occurring at the monitoring point 3. If the undamped oscillations go sufficiently negative to exceed the reverse bias limit of diode 24 it conducts in the reverse direction through resistor 11 to prevent further increases in the negative potential at the base of transistor 13. Thus the maximum negative potential to which the emitter-base circuit of transistor 13 can be subjected is fixed by the characteristic of diode 24. Similarly if such oscillations go sufficiently positive to exceed the forward bias limit of diode 24, it conducts in the forward direction to limit the positive peaks.

A capacitor 25 is connected between the base electrode of transistor 13 and ground to maintain conducting bias on transistor 13 for brief intervals. The closing of switchhook contacts 6 causes relay 5 to pick up and switch dial tone and dial impulse registration equipment, not shown in the drawing, on to the subscriber's line in place of relay 5 and source 4. In the switching interval there is no negative bias applied to the base of transistor 13 by source 4, and the base current flow in transistor 13 is determined primarily by the resistance of resistors 12 and 14 in the emitter-base loop and by the potential source 15. Capacitor 25, however, is charged to the potential of the base of transistor 13 before the circuit to relay 5 and source 4 is opened. In the switching interval capacitor 25 can only discharge through resistor 12 shunted by the input impedance of transistor 13 operating as a linear amplifier. The time constant of this R-C discharge is made high enough to prevent loss of the base potential during this switching interval, and maintain transistor 13 in its linear amplification operating range. However, the time constant of capacitor 25 and resistors 11 and 12 is also small enough for transistor 13 to be responsive to the varying potential conditions at junction 3 caused by dial impulses.

The operation of monitoring circuit 2 as a whole will now be considered. Before switchhook contacts 6 are closed by the subscriber lifting his handset from the cradle, the base electrode of transistor 13 is biased more negative than a predetermined cutoff potential. The reverse emitter leakage current of transistor 13 flowing in resistor 14 biases transistor switch 16 so that its base electrode is more negative than its emitter electrode and it is open. Only the low collector leakage current of transistor 16 flows in recorder 23.

Upon the closing of switchhook contacts 6 the potential at point 3 increases from the negative value corresponding approximately to the terminal voltage of source 4 to a value which is less negative by an amount corresponding to the potential drop across the winding resistance of relay 5. This increase in potential causes a corresponding increase, in a positive direction, of the potential at the base electrode of transistor 13. The negative bias imposed on the emitter electrode of transistor 13 by source 15 is thus overcome. Transistor 13 is driven into an active state wherein it functions as a substantially linear amplifier.

The flow of amplified emitter current of transistor 13 in resistor 14 is in a direction opposite to the flow of reverse emitter leakage current. The positive potential drop across resistor 14 now makes the base of transistor 16 more positive than its emitter. Transistor switch 16 is thereby driven into saturated conduction, and the collector current flowing through the stylus of recorder 23 makes a record of the time interval during which transistor switch 16 is closed.

The switching action of transistor 16 connects resistor 17 in parallel with resistor 14 thus reducing the impedance from the emitter electrode of transistor 13 to ground. This enables transistor 13 to handle a wide range of current variations without becoming saturated so the high input impedance of potentiometer 10 is maintained. The resistances of resistors 14 and 17 must be so chosen that their total parallel impedance is low enough to prevent saturation of transistor 13 within the desired range of signals to be applied to monitor circuit 2 and yet high enough to maintain the emitter follower action in the load circuit of transistor 13. Saturation of transistor 13 would cause its input impedance to drop to a low value, in the order of 1200 ohms, thus destroying the high input impedance of monitor circuit 2.

Transistor 16 conducts continuously until the subscriber starts to dial, and then it conducts intermittently during the dialing operation. The record on the chart in recorder 23 is similar to that shown in the above cited article and includes a line representing the interval following the initial closing of switchhook contacts 6 and preceding the first dial impulse. The record then shows a space each time dial contacts 8 open and a line each time they close because the operation of switch 8 causes the potential at monitor point 3 to vary about the cutoff bias value for conduction in transistor 13. The disposition of the central office equipment, including battery 4, relay 5 and monitor circuit 2, after the subscriber on loop 1 has been connected to his party will depend on the particular type of installation. It may be automatically switched to an inactive subscriber loop, or it may be maintained in readiness to serve the same loop when it becomes inactive again. In either case the equipment is disconnected from the active loop 1 by apparatus which is not shown, because it is not necessary for an understanding of the present invention, and monitor circuit 2 is thereby biased into its nonconducting condition.

If the terminal of potentiometer 10 which is connected to monitor junction 3 should inadvertently become disconnected from the subscriber line, transistor 13 would be biased into conduction by source 15. In this case base current is limited by resistor 12, and transistor 16 is driven into saturated conduction. Recorder 23 then makes a solid line on the record paper no matter what happens in the subscriber line so the record itself is an indication that something is faulty in monitor circuit 2.

This invention has been described in connection with a particular application thereof for the purpose of illustration. It should be understood that the invention is not limited to the specific circuit arrangement illustrated, but that many modifications and applications of the potential monitoring circuit will be apparent to those skilled in the art and are intended to be included within the spirit and scope of the claims.

What is claimed is:

1. An arrangement for monitoring potential variations about a predetermined potential in an electric circuit, said arrangement comprising two monitoring junctions in said circuit, a resistor connected between said monitoring junctions and having a resistance which is of a higher order of magnitude than the resistance of said circuit at said monitoring junctions, an amplifier, a first bias means for biasing said amplifier beyond cutoff in the absence of a potential between said monitoring junctions which differs from said predetermined potential in one direction, a second bias means including said resistor for overriding said first bias means and biasing said amplifier into an active state when the potential between said monitoring junction differs from said predetermined potential in another direction, an electronic switch having output terminals, for biasing said switch open in response to the biasing of said amplifier beyond cutoff, a load impedance connected between said output terminals of said switch, and indicating means connected in series with said load impedance between said output terminals, said switch biasing means biasing said switch closed in response to the biasing of said amplifier into conduction.

2. Means for coupling a transistor emitter follower in cascade with a transistor switch, said emitter follower having a quiescent reverse leakage current flowing through the emitter electrode thereof, said coupling means comprising a resistor, a source of potential, means connecting said resistor and said source of potential between ground potential and the emitter electrode of said emitter follower, a connection between the emitter electrode of said emitter follower and the base electrode of said transistor switch, means connecting the emitter of said transistor switch to a point intermediate said resistor and said source of potential so that said transistor switch is biased open by quiescent leakage current through the emitter electrode of said emitter follower and said resistor and biased closed in response to the driving of said emitter follower into conduction.

3. In combination with a first transistor connected for operation as a linear emitter-follower amplifier in response to signals applied thereto above a predetermined amplitude and within a predetermined range, means biasing said transistor amplifier cutoff for signals below said predetermined level, said transistor amplifier having a reverse leakage current flowing in its emitter electrode whenever it is cut off, a transistor switch, and means coupling said switch to be driven by said transistor amplifier, said coupling means comprising a first resistor, a source of potential, means connecting said first resistor and said source in series between the emitter electrode of said transistor amplifier and ground, a second resistor, means including said transistor switch for connecting said second resistor in parallel with said first resistor upon the triggering of said transistor amplifier into conduction, the parallel impedance of said first and second resistors being of such magnitude that said transistor amplifier operates substantially linearly throughout said range.

4. In a line observing and recording circuit for recording potential variations within a predetermined range on telephone transmission lines and the like, a first resistor having an impedance which is large compared to the impedance of said line, means connecting said resistor across said transmission line, a transistor amplifier having base, emitter, and collector electrodes and having a quiescent reverse leakage current flowing at said emitter electrode, a second resistor, a source of potential, means including said second resistor and said source for connecting a portion of said first resistor between said base and emitter electrodes to bias said amplifier beyond cutoff in response to potentials across said first resistor below a predetermined level and to bias said amplifier into conduction in response to potential variations across said first resistor above said level, a transistor switch, means including said second resistor for closing said switch in response to the flow of amplified current in said second resistor and for opening said switch in response to the flow of said quiescent current alone in said second resistor, a third resistor, an electric recording device, and means connecting said third resistor and said recording device in series with said switch and said source whereby a constant current flows in said recording device in response to the closing of said switch.

5. A first circuit for indicating potential variations about a predetermined level with respect to ground at a monitoring point in a second circuit, said first circuit comprising a potentiometer, a transistor amplifier having base, emitter, and collector electrodes, a first resistor, a source of potential, means for connecting said first resistor and said source in series between said emitter electrode and ground, a diode having a voltage-current characteristic including forward and reverse conducting regions and an intermediate region of nonconduction, bias means including said potentiometer connected to said base electrode to bias said amplifier nonconducting in the absence of potentials above a predetermined level at said monitoring point and for driving said amplifier into conduction in response to potentials at said monitoring point above said predetermined level, means for connecting said diode between said base electrode and ground to limit the voltage of said base electrode to a range of values defined by the forward and reverse conducting voltages of said diode, said diode being poled for forward conduction from said base electrode to ground, said amplifier nonconducting bias having a value in the nonconducting region of said diode characteristic, a capacitor, means including said capacitor connected to said base electrode for delaying changes in the bias on said base electrode, a transistor switch having base, emitter, and collector electrodes, a second resistor, direct current circuit means including said first and second resistors for connecting said switch base electrode to said amplifier and for biasing said switch open in response to quiescent reverse leakage current flowing in said amplifier emitter electrode and said first resistor and for biasing said switch closed in response to the flow of amplified current in said first resistor, said switch in its closed condition connecting said first and second resistors in parallel, a third resistor, an electric recording device, means for connecting said third resistor and said recording device in series with the emitter-collector circuit of said switch and with said source whereby a constant current is supplied to said recording device upon the closing of said switch.

References Cited in the file of this patent

UNITED STATES PATENTS 2,663,760 Buchner -------------- Dec. 22, 1953